(12) United States Patent
Oded (10) Patent No.: US 10,044,879 B1
(45) Date of Patent: Aug. 7, 2018

(54) SYSTEM, METHOD, AND COMPUTER PROGRAM FOR MONITORING AND ALLOCATING A QUOTA FOR A USER SESSION ASSOCIATED WITH A SERVICE CORRESPONDING TO A COMMUNICATION SERVICE PROVIDER (CSP)

(71) Applicant: Amdocs Development Limited, Limassol (CY)

(72) Inventor: Allon Marc Oded, Tel-Aviv (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/596,871

(22) Filed: May 16, 2017

Related U.S. Application Data (60) Provisional application No. 62/337,254, filed on May 16, 2016.

(51) Int. Cl.
  *H04M 15/00* (2006.01)
  *H04M 15/02* (2006.01)

(52) U.S. Cl.
  CPC ......... *H04M 15/887* (2013.01); *H04M 15/42* (2013.01); *H04M 15/8027* (2013.01); *H04M 15/888* (2013.01)

(58) Field of Classification Search
  CPC .... H04M 15/64; H04M 15/66; H04M 15/785; H04M 15/88; H04M 15/58; H04M 15/765
  See application file for complete search history.

(56) References Cited

U.S. PATENT DOCUMENTS 9,178,767 B2    11/2015  Kean et al.
2012/0117235 A1*  5/2012  Castro Castro ......... H04L 12/14
                                                              709/224

(Continued)

FOREIGN PATENT DOCUMENTS

CN    103974221 A    8/2014
EP    2249514 A1    11/2010

(Continued)

*Primary Examiner* — Dung Hong
(74) *Attorney, Agent, or Firm* — Zilka-Kotab, P.C.

(57) ABSTRACT

A system, method, and computer program product are provided for monitoring and allocating a quota for a user session associated with a service corresponding to a communication service provider (CSP). In operation, at least one user session associated with at least one user is identified for allocation of quota information (e.g. information associated with quota size, timeout, etc.) for use of a service associated with a communication service provider. The allocation of the quota information is based on an available balance for use by the at least one user. Further, at least one consumption report of previous quotas associated with the at least one user session is evaluated to identify intervals with high correlation of used service units for consecutive quotas. Additionally, a dynamic quota to allocate to the at least one user session is determined for at least one time period based on the identified intervals with high correlation of used service units for consecutive quotas. The dynamic quota includes at least one calculated quota for at least one specific future time interval based on actual past service usage by the at least one user session for at least one specific past time interval. Moreover, the dynamic quota is allocated to the at least one user session for use of the service associated with the communication service provider.

20 Claims, 11 Drawing Sheets

(56) References Cited

U.S. PATENT DOCUMENTS

| | | | |
|---|---|---|---|
| 2013/0148498 A1 | 6/2013 | Kean et al. | |
| 2014/0108212 A1* | 4/2014 | Cassel | H04M 15/8027 705/30 |
| 2014/0348030 A1* | 11/2014 | Tornkvist | H04L 12/1435 370/259 |
| 2015/0105045 A1* | 4/2015 | Rolfe | H04M 15/765 455/406 |
| 2015/0156334 A1* | 6/2015 | Chai | H04L 12/1467 455/406 |
| 2015/0188840 A1* | 7/2015 | Xiao | G06F 9/50 709/226 |
| 2015/0271342 A1* | 9/2015 | Gupta | H04M 15/60 455/406 |
| 2015/0327042 A1 | 11/2015 | Kempf et al. | |
| 2015/0358216 A1* | 12/2015 | Tian | H04L 47/822 709/226 |
| 2016/0164752 A1* | 6/2016 | Larsson | H04M 15/61 455/408 |
| 2016/0255159 A1* | 9/2016 | Beasley | G06F 11/00 709/226 |
| 2016/0373590 A1* | 12/2016 | Oltmanns | H04L 12/1407 |
| 2017/0048877 A1* | 2/2017 | Wang | H04W 4/24 |

FOREIGN PATENT DOCUMENTS

| | | |
|---|---|---|
| EP | 2816792 A1 | 12/2014 |
| WO | 2014108801 A1 | 7/2014 |
| WO | 2014207518 A1 | 12/2014 |
| WO | 2015028070 A1 | 3/2015 |

\* cited by examiner

SYSTEM, METHOD, AND COMPUTER PROGRAM FOR MONITORING AND ALLOCATING A QUOTA FOR A USER SESSION ASSOCIATED WITH A SERVICE CORRESPONDING TO A COMMUNICATION SERVICE PROVIDER (CSP)

CLAIM OF PRIORITY

This application claims the benefit of U.S. Provisional Application No. 62/337,254, filed May 16, 2016, the entire contents of which are incorporated herein by reference.

FIELD OF THE INVENTION

The present invention relates to quota monitoring and allocation for services associated with communication service providers.

BACKGROUND

As part of data charging for services associated with communication service providers, there is a process including a reservation of a balance against a quota (e.g. the amount of Mbytes granted to the network). After timeout (e.g. around 15 min, etc.), the network responds with a usage report indicating the amount of the Mbytes granted that were actually used and then requests a new quota. All traditional online charging systems work in this manner according to the established standard.

Operators limit their credit risk by using real time charging systems where authorization of services is continuously under surveillance by the charging system. Irrespective of whether a subscriber is given a zero credit limit, thereby having to prepay for their services, or allowed a non-zero credit limit to be paid after the service is rendered (e.g. via a monthly bill, etc.), real time charging is used to ensure that the subscriber cannot exceed an allowed credit limit. For similar reasons, end users expect control over their charges and demand equally safe control over their spending.

In order to handle charging control while coping with the increased need for real time credit control, the 3rd Generation Partnership Project 3GPP has (in TS 32.299) specified Diameter based offline and online charging applications for 3GPP networks. Using the offline charging mechanism, charging information does not affect, in real-time, the service rendered.

In contrast, online charging is the charging mechanism where charging information can affect, in real-time, the service rendered and therefore a direct interaction of the charging mechanism with session/service control is required.

However, a problem with the charging architecture as defined by 3GPP is that it does not provide a mechanism to handle the increased signaling and load on the communication network or a way to optimize the quota size and timeout to minimize this increase of load.

There is thus a need for addressing these and/or other issues associated with the prior art.

SUMMARY

A system, method, and computer program product are provided for monitoring and allocating a quota for a user session associated with a service corresponding to a communication service provider (CSP). In operation, at least one user session associated with at least one user is identified for allocation of quota information (e.g. information associated with quota size, timeout, etc.) for use of a service associated with a communication service provider. The allocation of the quota information is based on an available balance for use by the at least one user. Further, at least one consumption report of previous quotas associated with the at least one user session is evaluated to identify intervals with high correlation of used service units for consecutive quotas. Additionally, a dynamic quota to allocate to the at least one user session is determined for at least one time period based on the identified intervals with high correlation of used service units for consecutive quotas. The dynamic quota includes at least one calculated quota for at least one specific future time interval based on actual past service usage by the at least one user session for at least one specific past time interval. Moreover, the dynamic quota is allocated to the at least one user session for use of the service associated with the communication service provider.

DETAILED DESCRIPTION

Figure 1:
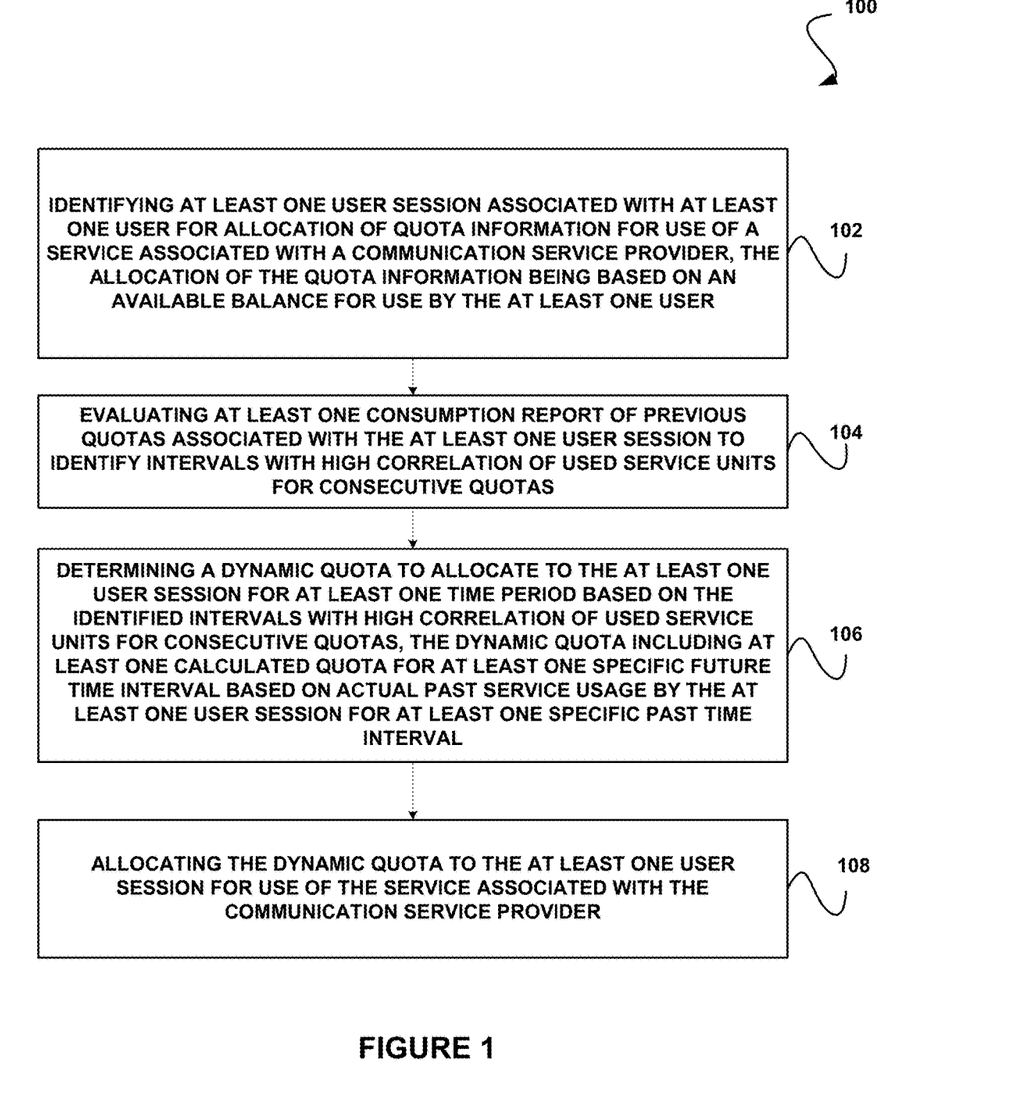
FIG. 1 illustrates a method for monitoring and allocating a quota for a user session associated with a service corresponding to a communication service provider (CSP), in accordance with one embodiment.

FIG. 1 illustrates a method 100 for monitoring and allocating a quota for a user session associated with a service corresponding to a communication service provider (CSP), in accordance with one embodiment.

As shown, at least one user session associated with at least one user is identified for allocation of quota information for use of a service associated with a communication service provider. See operation 102. The allocation of the quota information is based on an available balance for use by the user. The quota information may include any information associated with a quota, such as quota size, timeout information, etc. The quota may be associated with data and/or voice, etc. The user session may include a user call session and/or a data usage session, etc.

Further, at least one consumption report of previous quotas associated with the user session is evaluated to identify intervals with high correlation of used service units for consecutive quotas. See operation 104. The consumption report may include any data associated with previous quotas and the amount consumed.

Additionally, a dynamic quota to allocate to the user session is determined for at least one time period based on the identified intervals with high correlation of used service units for consecutive quotas. See operation 106. The dynamic quota includes at least one calculated quota for at least one specific future time interval based on actual past service usage by the user session for at least one specific past time interval.

Moreover, the dynamic quota is allocated to the user session for use of the service associated with the communication service provider. See operation 108. This may include allocating more data and/or voice minutes, etc.

It should be noted that the method 100 may be implemented utilizing various systems, hardware, software, applications, user interfaces, etc., as dictated by the implementer. For example, the method 100 may be implemented by a quota allocation system that includes one or more processors, etc. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

As previously indicated, one problem with the current charging architecture as defined by 3GPP is that it does not provide a mechanism to handle the increased signaling and load on the communication network or a way to optimize the quota size and timeout to minimize this increase of load.

Accordingly, in one embodiment, the system (e.g. the quota allocation system of FIG. 9, etc.) and techniques described herein may be utilized produce a dedicated detailed record for each quota (not only for the entire session). Since the reservation is done at a different point in time from the report against this allocation, it is complicated to conduct a correlation after-the-fact. The detailed record (DR) generated by the system (referred to herein as "Quota DR"), may be generated with data associated with both allocation and reports.

Figure 2:
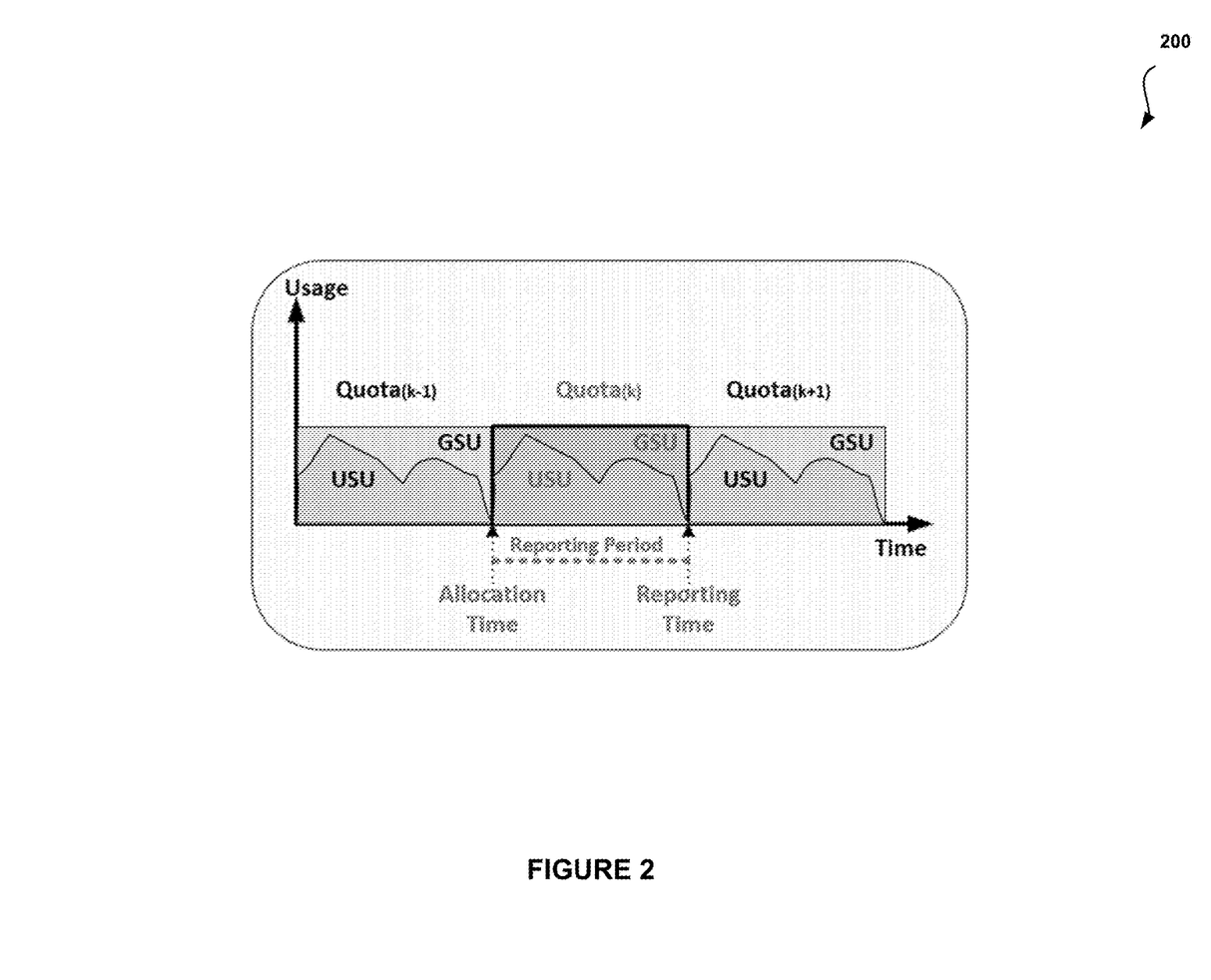
FIG. 2 shows an example graph showing quota allocation time and reporting time, in accordance with one embodiment.

FIG. 2 shows an example graph 200 showing quota allocation time and reporting time, in accordance with one embodiment. As an option, the graph 200 may be viewed in the context of the details of FIG. 1 and/or any subsequent figure(s). Of course, however, the graph 200 may be viewed in the context of any desired environment. Further, the aforementioned definitions may equally apply to the description below.

As shown, the graph 200 shows Granted Service Units (GSU) (i.e. Quota Size) and Used Service Units (USU) (i.e. the actual consumption).

The detailed record generated by the system (i.e. the Quota DR) may be used for further analysis (e.g. Big Data analysis, etc.), to recommend the best quota settings (e.g. size and expiration time, etc.) for different scenarios.

The system for generating Quota DR offers a solution for Quota Allocation tradeoff. Simply using a large quota is problematic to work with, because a large quota reduces subscriber balance immediately and limits simultaneous sessions. Whereas, a small quota increases the load on systems because of the need to reallocate frequently.

Many current systems provide "Static Quota" solutions, which includes a constant size of quota (and also constant Timeout, referred to as Validity Time [VT]). There could be several cases based on rating criteria at the beginning of a data session that would result in different "Static Quota" values. However, once a session begins, there are no changes to the quota settings.

Figure 3:
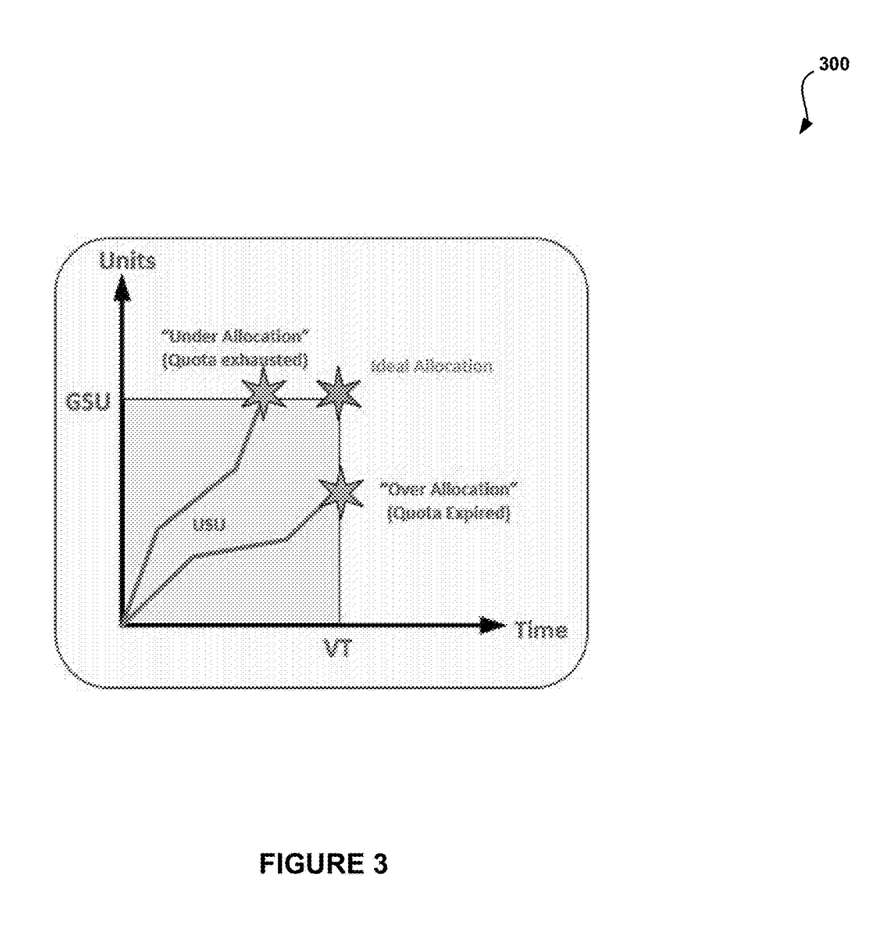
FIG. 3 shows an example graph showing quota size versus validity time, in accordance with one embodiment.

FIG. 3 shows an example graph 300 showing quota size versus validity time, in accordance with one embodiment. As an option, the graph 300 may be viewed in the context of the details of the previous figures and/or any subsequent figure(s). Of course, however, the graph 300 may be viewed in the context of any desired environment. Further, the aforementioned definitions may equally apply to the description below.

The validity time (VT) may also be referred to as a Quota Timeout. There may be many scenarios where a quota size was too big or too small, thus decreasing the utilization of a system. If the quota size were closer to the "ideal" allocation, then the load of quota requests per second, per system, would be lower.

To address this issue, the system described herein (e.g. the quota allocation system of FIG. 9, etc.) may implement a "Dynamic Quota" allocation process to increase utilization. In this case, in a certain data session, there may be many quotas that have a high correlation to the previous quotas from a consumption perspective.

Figure 4:
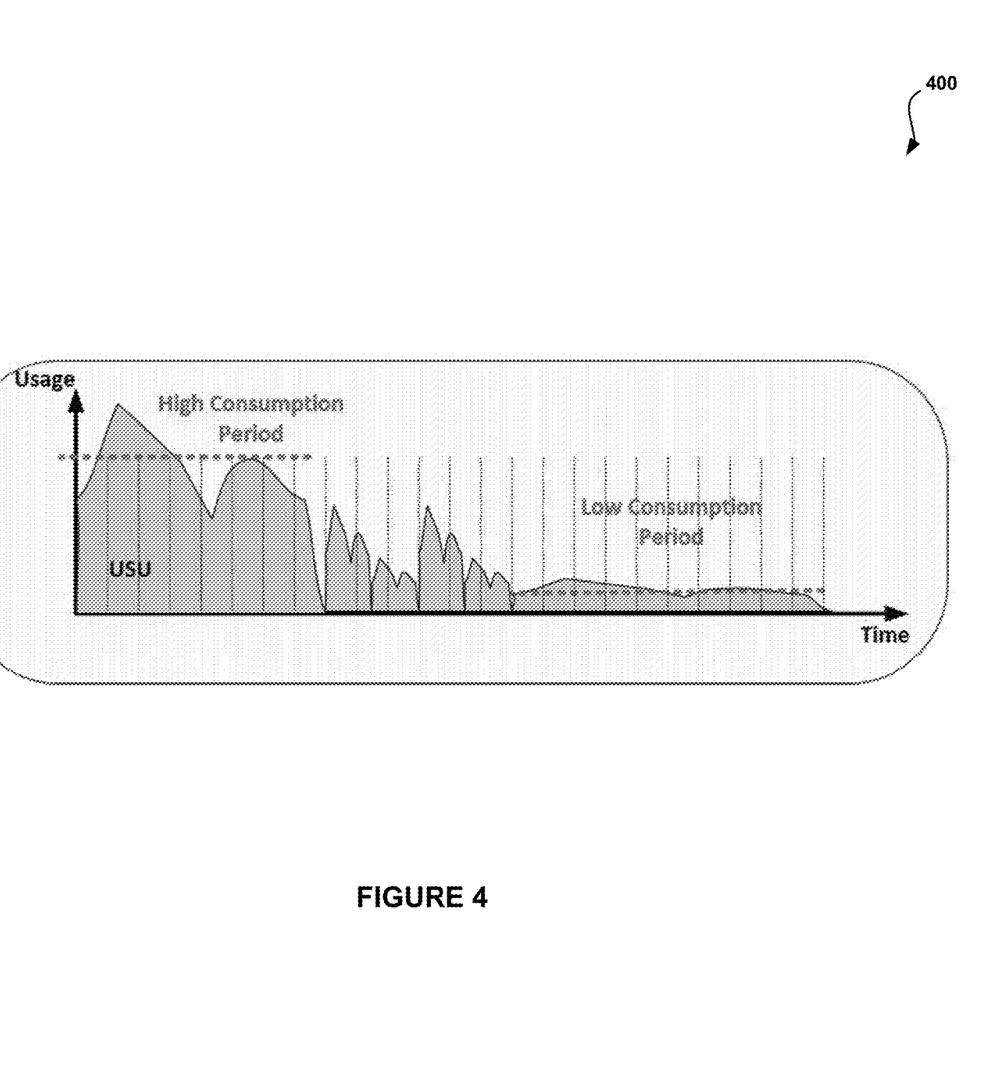
FIG. 4 shows an example graph showing high and low consumption periods associated with a user session, in accordance with one embodiment.

FIG. 4 shows an example graph 400 showing high and low consumption periods for a user session, in accordance with one embodiment. As an option, the graph 400 may be viewed in the context of the details of the previous figures and/or any subsequent figure(s). Of course, however, the graph 400 may be viewed in the context of any desired environment. Further, the aforementioned definitions may equally apply to the description below.

In one embodiment, the system for quota allocation and for generating Quota DR may generate a Quota DR including a detailed record per quota allocation and usage, and also implement a scoring module (as fields in the Quota DR) that will give empiric results showing exactly how much the dynamic allocation increased utilization over a static allocation. This scoring module may also be implemented when the actual dynamic allocation is not enabled (e.g. static is the default) and can show "what if" results for a given setup.

Figure 5:
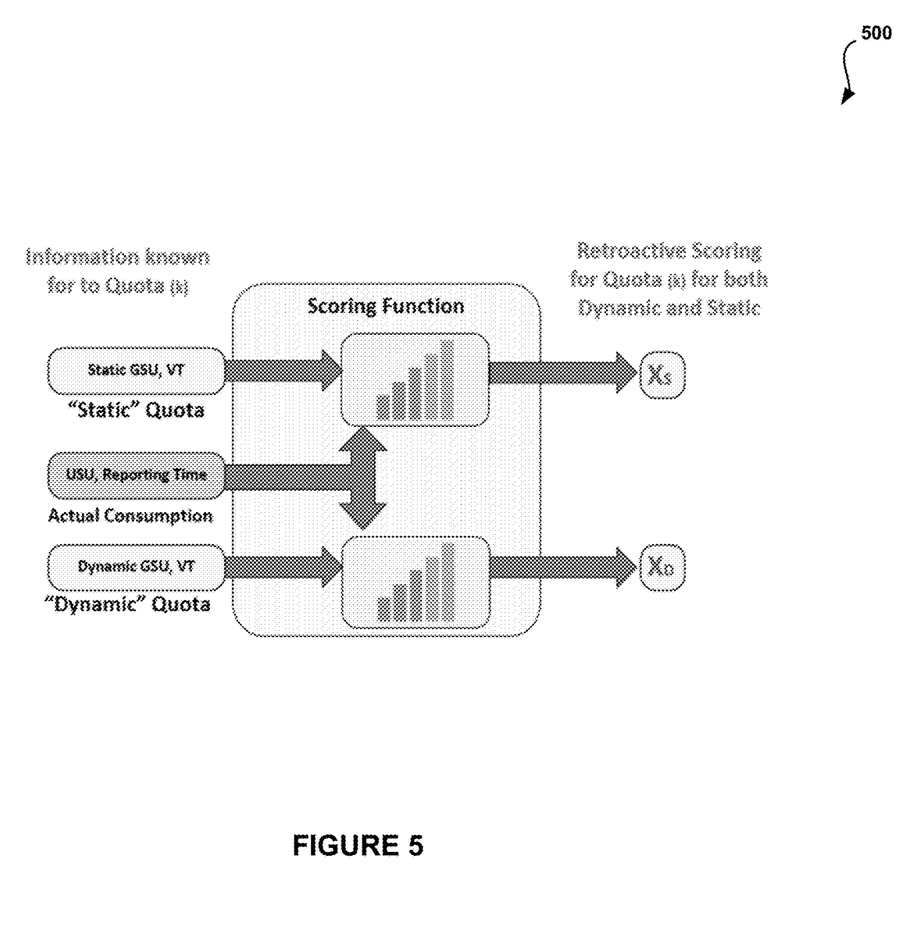
FIG. 5 shows a diagram of a system workflow for a scoring module/mechanism, in accordance with one embodiment.

FIG. 5 shows a diagram 500 of a system workflow for a scoring module, in accordance with one embodiment. As an option, the diagram 500 may be viewed in the context of the details of the previous figures and/or any subsequent figure(s). Of course, however, the diagram 500 may be viewed in the context of any desired environment. Further, the aforementioned definitions may equally apply to the description below.

Data (volume) consumption, unlike voice (time) consumption, must work with quota allocations provided from OCS to the Network Element (NE) that controls the actual usage of the quota. The OCS relies on NE feedback regarding the actual usage. The OCS cannot anticipate when the NE will return back with a new quota request, unlike in time-based where the OCS may run a timer.

Figure 6:
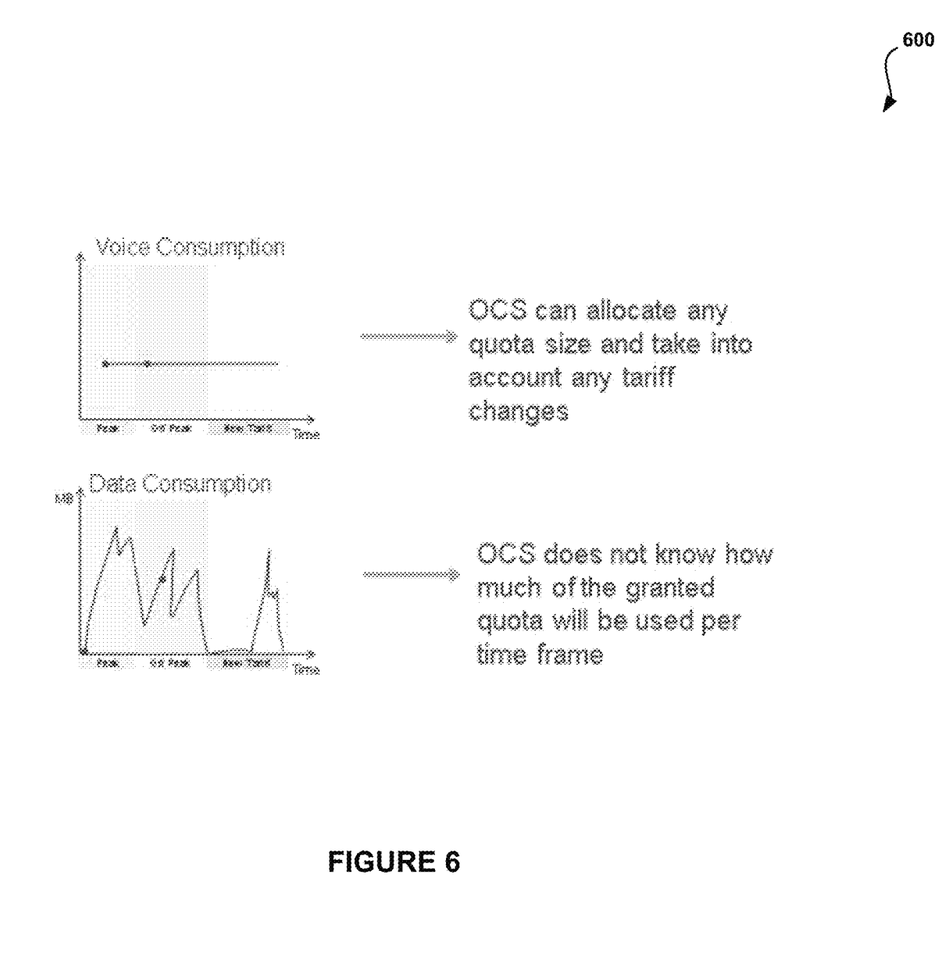
FIG. 6 shows graphs showing data and voice consumption of a user session versus time, in accordance with one embodiment.

FIG. 6 shows graphs 600 showing data and voice consumption versus time, in accordance with one embodiment. As an option, the graphs 600 may be viewed in the context of the details of the previous figures and/or any subsequent figure(s). Of course, however, the graphs 600 may be viewed in the context of any desired environment. Further, the aforementioned definitions may equally apply to the description below.

The quota mechanism requires the OCS to secure the balance that the quota is "worth". This balance is kept "aside" and is refereed as the "Reservation". The reservation ensures that when the actual usage is reported by the Network Element, the OCS will have enough balance from which to debit.

When the session ends, all reservations that are not used must be returned to the balance. This quota mechanism also enables simultaneous sessions to run in parallel, as each has its own reservation, and therefore there is no concern for a fraud situation.

The quota size is a tradeoff between being too big (which may cause a situation where a new session in parallel will not have enough balance left for reservation, thus affecting service and a potential loss of revenue, etc.) and being too small (which causes an overload of messages in Diameter and towards OCS, thus affecting capacity).

The 3GPP (32.299) defines the following Online Rating Flow: Session Charging with Unit Reservation (SCUR), which is relevant for long data sessions [CCR(I), several CCR(U) and CCR(T)].

Figure 7:
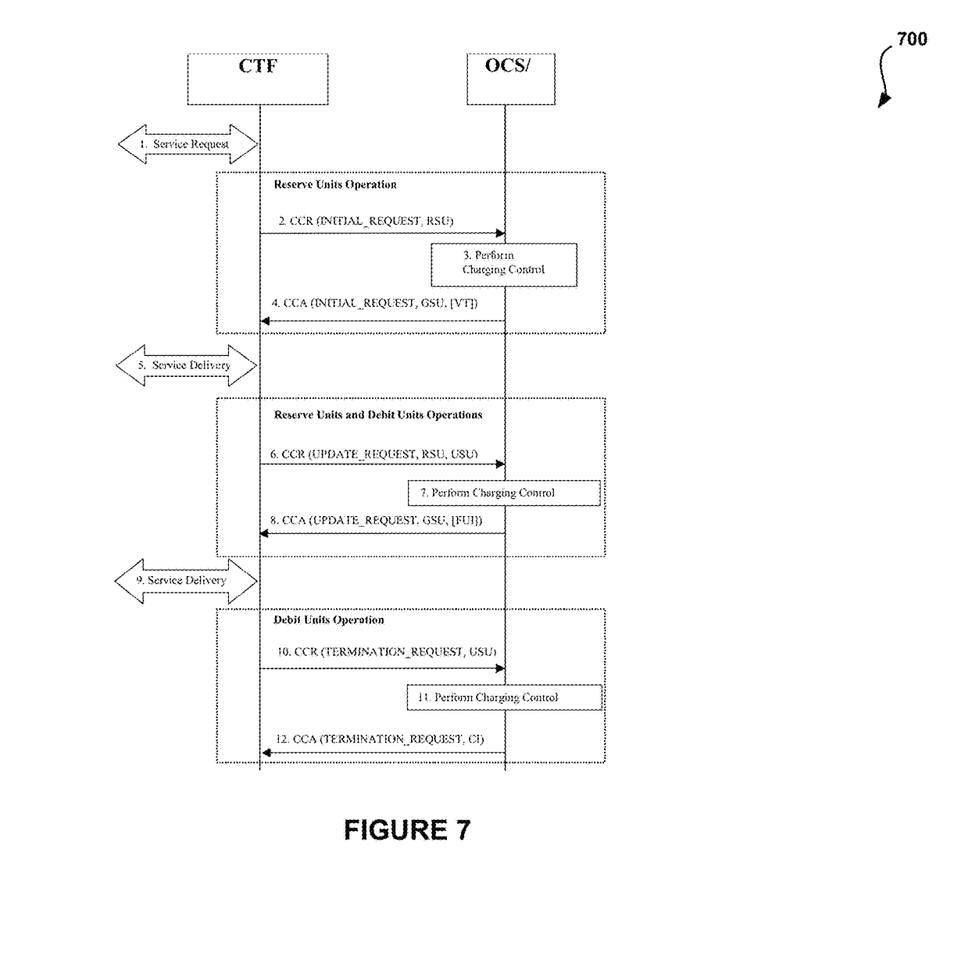
FIG. 7 shows a diagram of a system workflow including CTF and OCS (Online Charging Systems), in accordance with one embodiment.

FIG. 7 shows a diagram 700 of a system workflow including CTF and OCS, in accordance with one embodiment. As an option, the diagram 700 may be viewed in the context of the details of the previous figures and/or any subsequent figure(s). Of course, however, the diagram 700 may be viewed in the context of any desired environment. Further, the aforementioned definitions may equally apply to the description below.

Quota DR is generated by the system for a quota at the time of reporting on its consumption and not at the time it was allocated. Thus, the OCS service will start preparing the Quota DR in step 4 in the diagram of FIG. 7 and the Quota DR will be concluded and generated in step 6 (same with steps 8 and 10).

Thus, one improvement over conventional systems is generating statistics that OCS does as part of its logic and reservation logic that is run regardless. If the Quota DR is not generated by the OCS, it would have to be done afterwards in a data warehouse, which may be problematic in some cases as it will require OCS to generate separate reservation and consumption dedicated records per quota handling, and a correlation between pairs for the same quota.

In some cases, there could be tens of quotas per real-time subscriber, per day, so allocation can be a challenging task. With growth of data, this is only expected to grow.

Based on the Quota DR statistics, and based on the utilization (which is the USU/GSU factor), the system described herein may be utilized to set an appropriate quota size that will be best for the trade-off. The quota size is defined differently for each scenario, for example, per rating group (rating conditions), per RAT (Radio Access Technology, like 3G, LTE, etc.), etc.

Thus, there are multiple decisions per system, and such decisions may change over time, so usage, etc., needs to be monitored in an ongoing manner.

The system generates the Quota DR, which is on top of logic the OCS is running as part of standard OCS charging flow.

The system uses the scoring as a mechanism to empirically show if and by how much utilization has better results due to: change in static quota parameters; dynamic allocation over the static allocation; and "what if" scenarios applied to past results.

Figure 8:
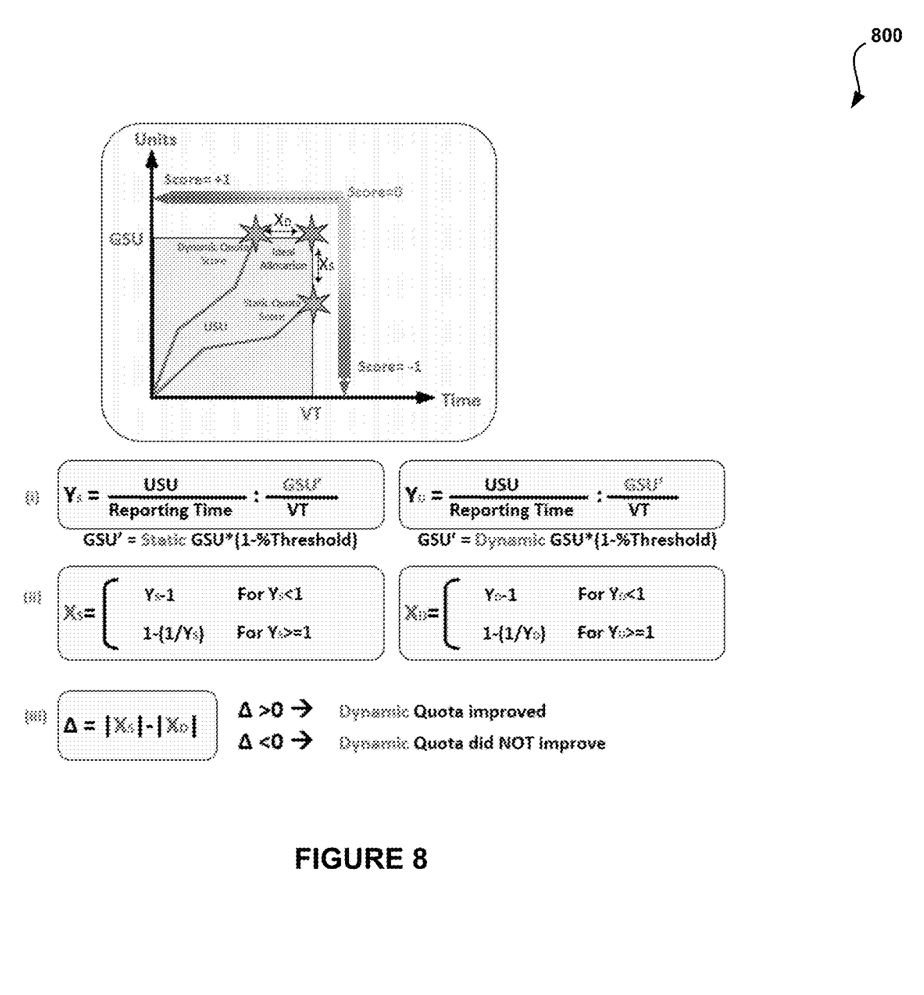
FIG. 8 shows a diagram illustrating how to generate dynamic and static quota scoring retroactively for a past quota, in accordance with one embodiment.

FIG. 8 shows a diagram 800 illustrating how to generate dynamic and static quota scoring retroactively for a past quota, in accordance with one embodiment. As an option, the diagram 800 may be viewed in the context of the details of the previous figures and/or any subsequent figure(s). Of course, however, the diagram 800 may be viewed in the context of any desired environment. Further, the aforementioned definitions may equally apply to the description below.

It should be noted that the system described herein may perform quota allocation, generation of quota detailed reports (Quota DR), and/or scoring. Further, such system may include various hardware (e.g. memory, processors, servers, etc.) and may be associated with one or more communication service providers, billing systems, charging systems, etc.

In one embodiment, to generate the Quota DR, the system may implement a method, comprising: a) identifying at least one user session for allocation of a quota information (e.g. size, timeout, etc.) for use of a service associated with a communication service provider, where the quota allocation is based on available balance for use by the at least one user; b) determining at least one quota to allocate and balance reservation to the at least one user session for at least one time period; c) generating a record for each determined quota once its consumption report is received (one record per specific quota), where the report includes information associated with allocation and reporting of a single quota and also additional relevant protocol; and d) calculating utilization (consumption versus allocation) data corresponding to the at least one quota utilizing the generated record corresponding to the at least one quota. In this case, steps "a" and "b" may be according to industry Standard (RFC 4006) and may be common to all OCS (Online Charging Systems). With respect to step "c", additional information may include Rating Group (linked to applications) and RAT (Radio Access Technology, like 3G, LTE, etc.), etc. Further, Quota DRs may be used as a basis for analytics and optimization.

Additionally, in one embodiment, the system may implement Quota Scoring by implementing a method, comprising: a) determining a grade that reflects the match between allocation and actual consumption based on a scoring method with a single scoring scale for both Service Units and Time based on information recorded in the Quota DR. The system may also implement a technique for comparing a score between alternative quota allocations to provide an overall empiric comparison as to improvement: between old static and new (changed) static allocations; between existing static and potential static allocations (i.e. a 'what if' scenario); and between static (non-dynamic) and dynamic quota.

Further, in one embodiment, the system may perform quota allocation by implementing a method, comprising: a) based on history of Quota DRs, identifying scenarios including intervals with high correlation of used service units for consecutive quotas where a dynamic quota is best to be used; b) determining a dynamic quota to allocate to the at least one user session for at least one time period based on the identified intervals with high correlation of used service units for consecutive quotas, the dynamic quota (combination of size (Granted Service Units) and timeout (Validity Time)) including at least one calculated quota for at least one specific future time interval, based on actual past service usage by the at least one user session for at least one specific past time interval; and c) allocating the dynamic quota to the at least one user session for use of the service associated with the communication service provider. In this case, steps "b" and "c" are innovative in that new quota allocation is also changing the default Validity Time and not only the Quota Size.

Quota DRs are beneficial for calculating systems measurements such as, for example: System Utilization as a percentage (Aggregative USU/Aggregative GSU); System Consumed Bandwidth in Gbytes per sec (by Aggregative USU/Time Interval); and System Consumed Load in Quota Requests per sec (by Aggregative Quota DR Count/Time Interval). All of these can be according to breakdown of dimensions within the Quota DR fields such as Rating Group/RAT/Time of day, etc. Extensions of Quota Validity Time in low usage scenarios (instead of going below a minimum Quota size) may also be used to reduce load.

Figure 9:
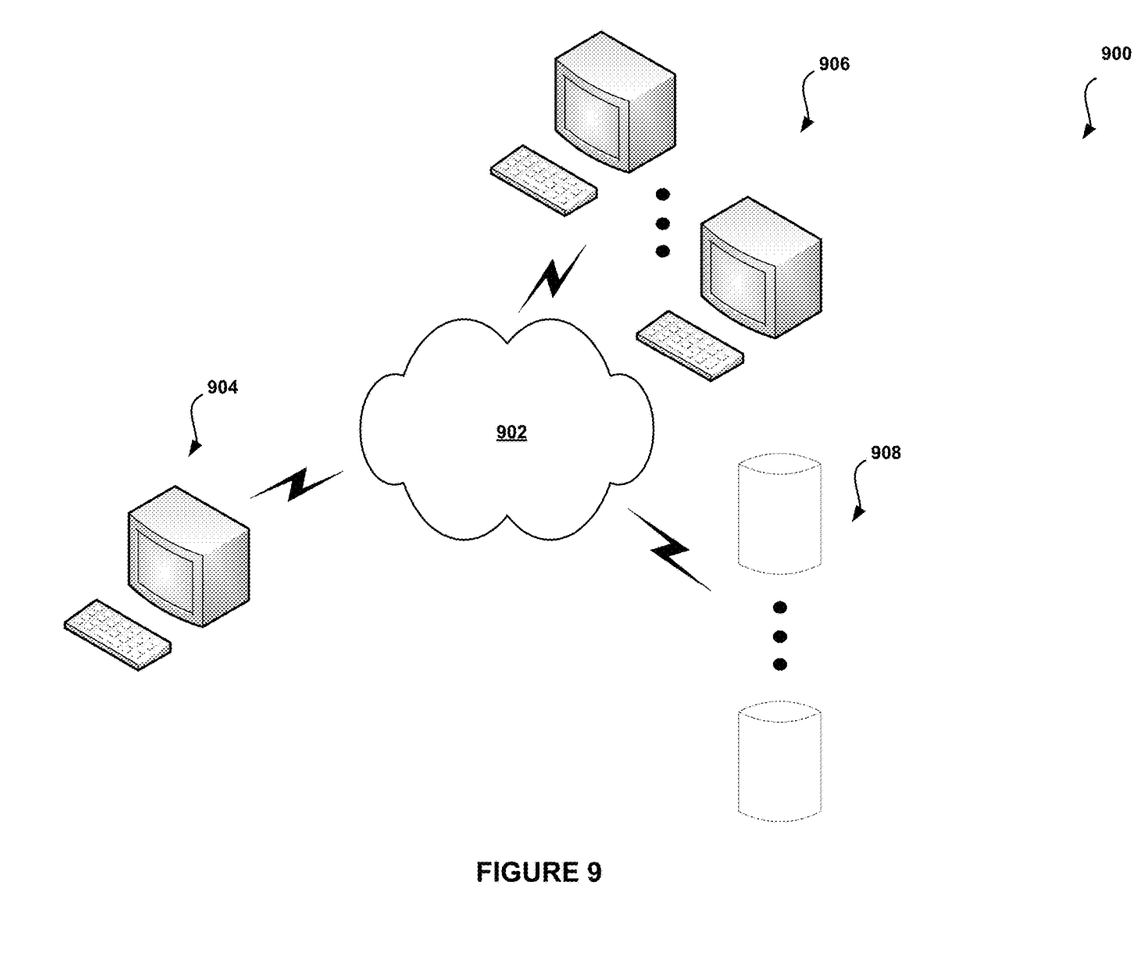
FIG. 9 illustrates a system for monitoring and allocating a quota for a user session associated with a service corresponding to a communication service provider, in accordance with one embodiment.

FIG. 9 shows a system 900 for monitoring and allocating a quota for a user session associated with a service corresponding to a communication service provider, in accordance with one embodiment. As an option, the system 900 may be implemented in the context of the details of the previous figures and/or any subsequent figure(s). Of course, however, the system 900 may be implemented in the context of any desired environment. Further, the aforementioned definitions may equally apply to the description below.

As shown, the system 900 includes a quota allocation system 904, which may implement a variety of applications or software, etc. The quota allocation system 904 may be capable of communicating with a plurality of systems 906, either directly or over one or more networks 902.

The quota allocation system 904 is also in communication with one or more repositories/databases 908.

In operation, the quota allocation system 904 identifies at least one user session associated with at least one user for allocation of quota information for use of a service associated with a communication service provider. The allocation of the quota information is based on an available balance for use by the user.

The quota allocation system 904 evaluates at least one consumption report of previous quotas associated with the user session to identify intervals with high correlation of used service units for consecutive quotas. Further, the quota allocation system 904 determines a dynamic quota to allocate to the user session for at least one time period based on the identified intervals with high correlation of used service units for consecutive quotas. The dynamic quota includes at least one calculated quota for at least one specific future time interval based on actual past service usage by the user session for at least one specific past time interval.

Moreover, the quota allocation system 904 allocates the dynamic quota to the user session for use of the service associated with the communication service provider.

In one embodiment, the quota allocation system 904 may also compare a score between a static (non-dynamic) quota and the dynamic quota to provide an overall empiric comparison as to improvement. Additionally, the quota allocation system 904 may identify scenario intervals with high correlation of used service units for consecutive quotas where the dynamic quota is best to be used, based on a history of quota detailed reports (DRs).

In one embodiment, the quota allocation system 904 may generate quota DRs by: identifying at least one user session associated with a user for allocation of quota information (e.g. information associated with quota size, timeout, etc.) for use of a service associated with a communication service provider, the quota allocation being based on an available balance for use by the at least one user; determining at least one quota and balance reservation to allocate to the at least one user session for at least one time period; generating a record for each determined quota once a corresponding consumption report is received (one record per specific quota), the report including information associated with allocation and reporting of a single quota and also additional relevant protocol; and calculating utilization (consumption versus allocation) data corresponding to the at least one quota utilizing the generated record corresponding to the at least one quota.

Still yet, in one embodiment, the quota allocation system 904 may determine a grade that reflects the match between allocation and actual consumption based on a scoring method with a single scoring scale for both service units and time.

Figure 10:
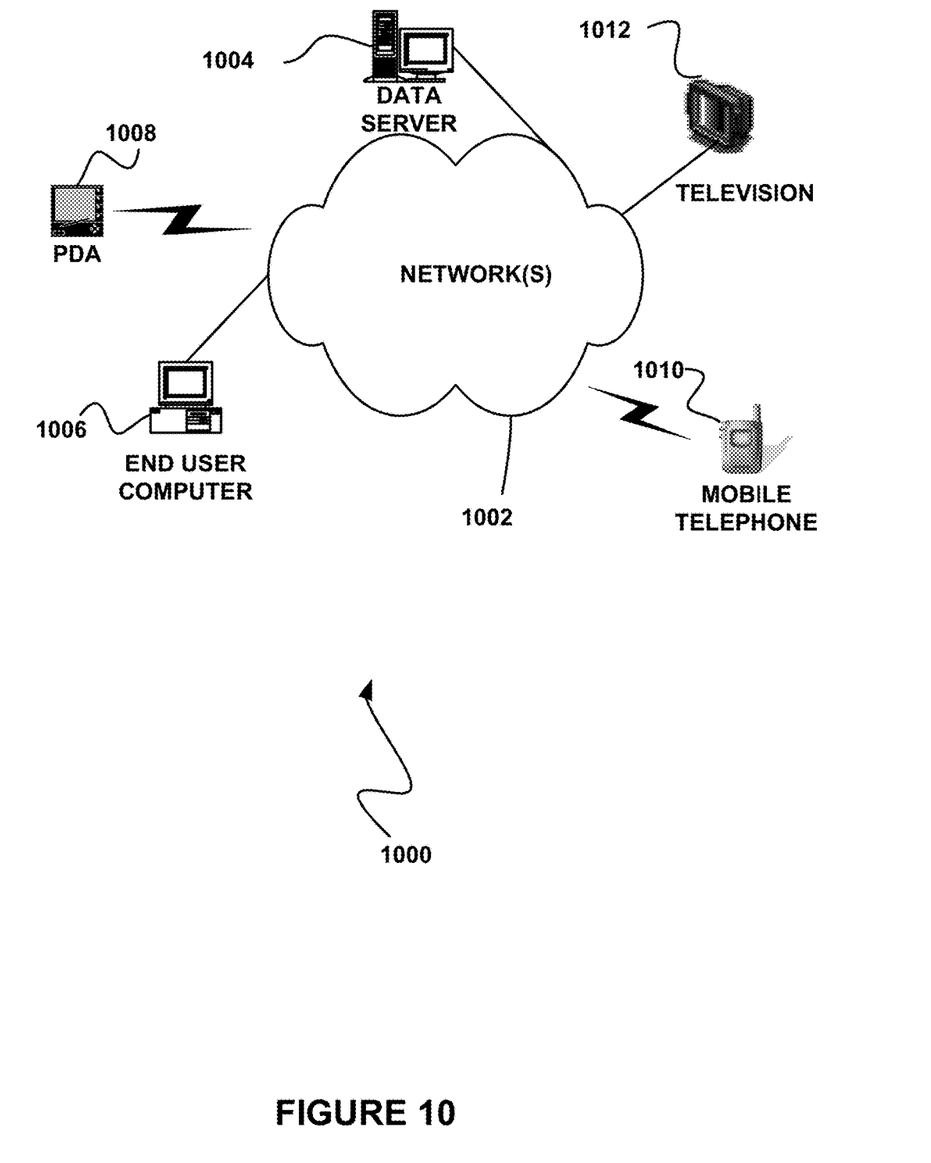
FIG. 10 illustrates a network architecture, in accordance with one possible embodiment.

FIG. 10 illustrates a network architecture 1000, in accordance with one possible embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1004 and an end user computer 1006 may be coupled to the network 1002 for communication purposes. Such end user computer 1006 may include a desktop computer, lap-top computer, and/or any other type of logic. Still yet, various other devices may be coupled to the network 1002 including a personal digital assistant (PDA) device 1008, a mobile phone device 1010, a television 1012, etc.

Figure 11:
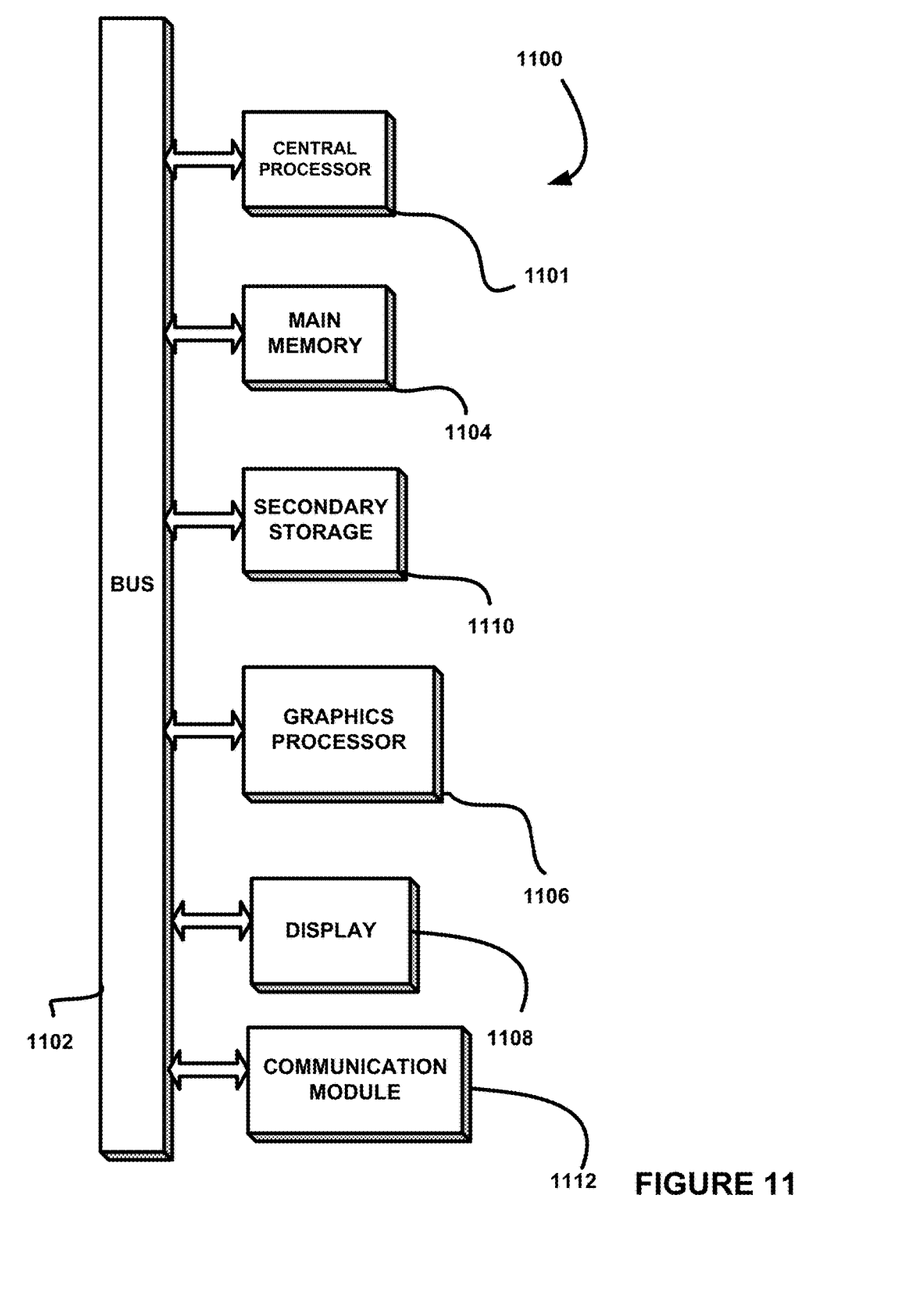
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. Of course, the system 1100 may be implemented in any desired environment.

As shown, a system 1100 is provided including at least one central processor 1101 which is connected to a communication bus 1102. The system 1100 also includes main memory 1104 [e.g. random access memory (RAM), etc.]. The system 1100 also includes a graphics processor 1106 and a display 1108.

The system 1100 may also include a secondary storage 1110. The secondary storage 1110 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1110, and/or any other memory, for that matter. Such computer programs, when executed, enable the system 1100 to perform various functions (as set forth above, for example). Memory 1104, storage 1110 and/or any other storage are possible examples of non-transitory computer-readable media.

The system 1100 may also include one or more communication modules 1112. The communication module 1112 may be operable to facilitate communication between the system 1100 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, at least one user session associated with at least one user for allocation of quota information for use of a service associated with a communication service provider, the allocation of the quota information being based on an available balance for use by the at least one user;

evaluating, by the system, at least one consumption report of previous quotas associated with the at least one user session to identify intervals with high correlation of used service units for consecutive quotas;

determining, by the system, a dynamic quota to allocate to the at least one user session for at least one time period based on the identified intervals with high correlation of used service units for consecutive quotas, the dynamic quota including at least one calculated quota for at least one specific future time interval based on actual past service usage by the at least one user session for at least one specific past time interval; and allocating, by the system, the dynamic quota to the at least one user session for use of the service associated with the communication service provider.

2. The method of claim 1, further comprising comparing, by the system, a score between a non-dynamic quota and the dynamic quota to provide an overall empiric comparison indicating improvement.

3. The method of claim 1, further comprising identifying, by the system, scenario intervals with high correlation of used service units for consecutive quotas where the dynamic quota is best to be used, based on a history of quota detailed reports (DRs).

4. The method of claim 3, wherein the quota detailed reports are generated by:
determining, by the system, at least one quota and balance reservation to allocate to the at least one user session for at least one time period;
generating, by the system, a record for each determined quota once a corresponding consumption report is received, the consumption report including information associated with allocation and reporting of a single quota and relevant protocol information; and
calculating, by the system, utilization data corresponding to the at least one quota utilizing the generated record corresponding to the at least one quota.

5. The method of claim 4, further comprising determining, by the system, a grade that reflects a match between allocation and actual consumption based on a scoring technique with a single scoring scale for both service units and time.

6. The method of claim 1, wherein extensions of quota validity time in low usage scenarios are used to reduce load of a communication service provider system.

7. The method of claim 1, wherein the quota information includes information associated with quota size or a timeout.

8. A computer program product embodied on a non-transitory computer readable medium, comprising computer code for:
identifying, by a system, at least one user session associated with at least one user for allocation of quota information for use of a service associated with a communication service provider, the allocation of the quota information being based on an available balance for use by the at least one user;
evaluating, by the system, at least one consumption report of previous quotas associated with the at least one user session to identify intervals with high correlation of used service units for consecutive quotas;
determining, by the system, a dynamic quota to allocate to the at least one user session for at least one time period based on the identified intervals with high correlation of used service units for consecutive quotas, the dynamic quota including at least one calculated quota for at least one specific future time interval based on actual past service usage by the at least one user session for at least one specific past time interval; and
allocating, by the system, the dynamic quota to the at least one user session for use of the service associated with the communication service provider.

9. The computer program product of claim 8, further comprising computer code for comparing, by the system, a score between a non-dynamic quota and the dynamic quota to provide an overall empiric comparison indicating improvement.

10. The computer program product of claim 8, further comprising computer code for identifying, by the system, scenario intervals with high correlation of used service units for consecutive quotas where the dynamic quota is best to be used, based on a history of quota detailed reports (DRs).

11. The computer program product of claim 10, wherein the quota detailed reports are generated by:
determining, by the system, at least one quota and balance reservation to allocate to the at least one user session for at least one time period;
generating, by the system, a record for each determined quota once a corresponding consumption report is received, the consumption report including information associated with allocation and reporting of a single quota and relevant protocol information; and
calculating, by the system, utilization data corresponding to the at least one quota utilizing the generated record corresponding to the at least one quota.

12. The computer program product of claim 11, further comprising computer code for determining, by the system, a grade that reflects a match between allocation and actual consumption based on a scoring technique with a single scoring scale for both service units and time.

13. The computer program product of claim 8, wherein extensions of quota validity time in low usage scenarios are used to reduce load of a communication service provider system.

14. The computer program product of claim 8, wherein the quota information includes information associated with quota size or a timeout.

15. A system comprising one or more processors operable for:
identifying, by the system, at least one user session associated with at least one user for allocation of quota information for use of a service associated with a communication service provider, the allocation of the quota information being based on an available balance for use by the at least one user;
evaluating, by the system, at least one consumption report of previous quotas associated with the at least one user session to identify intervals with high correlation of used service units for consecutive quotas;
determining, by the system, a dynamic quota to allocate to the at least one user session for at least one time period based on the identified intervals with high correlation of used service units for consecutive quotas, the dynamic quota including at least one calculated quota for at least one specific future time interval based on actual past service usage by the at least one user session for at least one specific past time interval; and
allocating, by the system, the dynamic quota to the at least one user session for use of the service associated with the communication service provider.

16. The system of claim 15, wherein the system is further operable for comparing, by the system, a score between a non-dynamic quota and the dynamic quota to provide an overall empiric comparison indicating improvement.

17. The system of claim 15, wherein the system is further operable for identifying, by the system, scenario intervals with high correlation of used service units for consecutive quotas where the dynamic quota is best to be used, based on a history of quota detailed reports (DRs).

18. The system of claim 17, wherein the quota detailed reports are generated by:
   determining, by the system, at least one quota and balance reservation to allocate to the at least one user session for at least one time period;
   generating, by the system, a record for each determined quota once a corresponding consumption report is received, the consumption report including information associated with allocation and reporting of a single quota and relevant protocol information; and
   calculating, by the system, utilization data corresponding to the at least one quota utilizing the generated record corresponding to the at least one quota.

19. The system of claim 18, wherein the system is further operable for determining, by the system, a grade that reflects a match between allocation and actual consumption based on a scoring technique with a single scoring scale for both service units and time.

20. The system of claim 19, wherein extensions of quota validity time in low usage scenarios are used to reduce load of a communication service provider system.

* * * * *